US007643186B2

(12) United States Patent
Hozono et al.

(10) Patent No.: US 7,643,186 B2
(45) Date of Patent: Jan. 5, 2010

(54) IMAGE FORMING DEVICE, METHOD FOR ADJUSTING TONER CONCENTRATION, PROGRAMS, AND RECORDING MEDIA OF THE SAME

(75) Inventors: Tomohide Hozono, Osaka (JP); Chisato Hatakeyama, Kanagawa (JP)

(73) Assignee: Kyocera Mita Corporation, Osaka (JP)

( * ) Notice: Subject to any disclaimer, the term of this patent is extended or adjusted under 35 U.S.C. 154(b) by 399 days.

(21) Appl. No.: 11/723,881

(22) Filed: Mar. 22, 2007

(65) Prior Publication Data

US 2007/0229921 A1 Oct. 4, 2007

(30) Foreign Application Priority Data

Mar. 29, 2006 (JP) ............................. 2006-091448

(51) Int. Cl.
*G06F 15/00* (2006.01)
*H04N 1/46* (2006.01)
*G03G 15/16* (2006.01)
*G03G 15/01* (2006.01)

(52) U.S. Cl. ........................ 358/504; 358/1.9; 358/406; 358/509; 358/446; 399/39; 399/46; 399/49; 399/66; 399/297; 399/298; 399/299; 399/300; 399/301; 399/302; 399/303; 399/308; 399/312

(58) Field of Classification Search .......... 358/504.406, 358/509, 446, 1.9, 504, 406; 382/32, 65; 399/301, 302, 66, 303, 308, 312, 39, 46, 399/49, 297, 298, 299, 300

See application file for complete search history.

(56) References Cited

U.S. PATENT DOCUMENTS

| | | | | |
|---|---|---|---|---|
| 5,587,783 | A * | 12/1996 | Nakamura et al. | .......... 399/301 |
| 7,050,746 | B2 * | 5/2006 | Hirai et al. | .................. 399/302 |
| 2005/0260004 | A1 | 11/2005 | Maebashi et al. | |

FOREIGN PATENT DOCUMENTS

| | | | |
|---|---|---|---|
| CN | 1694012 | A | 11/2005 |
| JP | 11-258872 | A | 9/1999 |
| JP | H11-295941 | A | 10/1999 |
| JP | 2005-148299 | A | 6/2005 |

* cited by examiner

*Primary Examiner*—Edward L Coles
*Assistant Examiner*—Charlotte M Baker
(74) *Attorney, Agent, or Firm*—Global IP Counselors, LLP

(57) ABSTRACT

An image forming device has image forming units 3-6, a transfer belt 7, a position detection unit 19, a concentration sensor 23, and an adjustment unit. A toner image is formed on the surfaces of the image forming units 3-6, and transferred onto the transfer belt 7. The position detection unit 19 detects a predetermined position on the surface of the transfer belt 7. On the predetermined position, the concentration sensor 23 detects first information relating to the color of the surface of the transfer belt 7. The concentration sensor 23 detects second information relating to the color of the pattern image that is formed on the predetermined position. The adjustment unit adjusts toner concentration at the time of forming an image based on the first information and the second information detected by the concentration sensor 23.

13 Claims, 8 Drawing Sheets

IMAGE FORMING DEVICE, METHOD FOR ADJUSTING TONER CONCENTRATION, PROGRAMS, AND RECORDING MEDIA OF THE SAME

CROSS-REFERENCE TO RELATED APPLICATIONS

This application claims priority to Japanese Patent Application No. 2006-091448 filed on Mar. 29, 2006. The entire disclosure of Japanese Patent Application No. 2006-091448 is hereby incorporated herein by reference.

BACKGROUND OF THE INVENTION

1. Field of the Invention

The present invention generally relates to an image forming device. More specifically, the present invention relates to an image forming device, such as a copying machine, a printer, a facsimile machine, and the like.

2. Background Information

Conventionally, in color image forming devices, the method used in transferring a toner image onto a sheet of paper is by respectively superimposing the black, yellow, magenta, and cyan color toner images onto the transfer belt before combining the toner images thereof onto the sheet of paper.

In this type of image forming device, the toner concentration is adjusted because sometimes due to a degradation of toner or the like, the intended color concentration of an image may not be produced.

A method of adjusting toner concentration is disclosed in Japan Patent Application Publication JP-11-258872, for example. In this method, first, a pattern image is formed using the image forming unit, which is adjusted in order to maintain the intended color concentration. Then, the difference between the color concentration of the pattern image that is actually formed and the intended color concentration is investigated. In the toner concentration information of an image that is formed by the image forming unit, this difference is reflected in order to form images with the intended toner color concentration. The adjustment of the toner concentration of an image to be formed is made by adjusting the bias of the transfer roller, and the like, that is included in the image forming unit.

However, in the conventional method for adjusting the toner concentration, the color concentration on the surface of the transfer belt is not taken into consideration. Therefore, for example, when the color concentration on the surface of the transfer belt changes due to a stain or toner that is attached thereon, proper adjustment of the toner concentration cannot be made.

In view of the above, it will be apparent to those skilled in the art from this disclosure that there exists a need for an improved image forming device. This invention addresses this need in the art as well as other needs, which will become apparent to those skilled in the art from this disclosure.

SUMMARY OF THE INVENTION

An object of the present invention is to provide an image forming device that is able to adjust toner concentration more properly, taking into consideration the unresolved problems of the conventional image forming devices, and provide a toner concentration adjusting method for the image forming device.

The image forming device according to a first aspect of the present invention has image forming units, a transfer belt, a position detection unit, a first information sensor, a second information sensor, and an adjustment unit. A toner image is formed on the surfaces of the image forming units. The toner image formed on the image forming units is transferred to the transfer belt. The position detection unit detects a predetermined position of the transfer belt using the surface of the transfer belt. The first information sensor detects first information relating to the degree of reflection of the surface of the transfer belt at the predetermined position. The second information sensor detects second information relating to color concentration of a pattern image that is formed on the transfer belt to be read at the predetermined position. The adjustment unit adjusts toner concentration at the time of forming an image based on the first information and the second information detected by the first information sensor and the second information sensor.

The image forming device according to a second aspect of the present invention is the device of the first aspect, wherein the adjustment unit has a pattern image forming unit, a detection information correction unit, a comparison unit, and a control unit. The pattern image forming unit forms a pattern image to be read at the predetermined position of the transfer belt based on pattern information relating to color concentration to form the pattern image. The detection information correction unit uses the first information detected by the first information sensor to correct the second information detected by the second information sensor. The comparison unit compares the second information that is corrected by the detection information correction unit with pattern information. The control unit controls toner concentration based on the result of the comparison unit.

The image forming device according to a third aspect of the present invention is the device of the second aspect, wherein the detected information correction unit has a difference calculation unit that obtains the difference between the first information and initial information relating to the color of the surface of the transfer belt in an initial state, and a second information correction unit that reflects the difference in the second information.

The image forming device according to a fourth aspect of the present invention is the device of the first aspect, wherein the adjustment unit has an information storage unit, a pattern information correction unit, a pattern image forming unit, a comparison unit, and a control unit. The information storage unit stores pattern information relating to color that forms the pattern image. The pattern information correction unit uses the first information detected by the first information sensor to correct pattern information that is stored in the pattern information storage unit. The pattern image forming unit forms pattern image to be read at the predetermined position of the transfer belt based on pattern information that is corrected by the pattern information correction unit. The comparison unit compares the second information detected by the second information sensor with pattern information that is not corrected. The control unit controls toner concentration based on the result of the comparison unit.

The image forming device according to a fifth aspect of the present invention is the device of the fourth aspect, wherein the pattern information correction unit includes a difference calculation unit that obtains the difference between the first information and the initial information relating to the color of the surface of the transfer belt in an initial state, and a pattern information calculation unit that reflects the difference in the pattern information.

The image forming device according to a sixth aspect of the present invention is the device of the first aspect, wherein the control unit adjusts the concentration information in the image information to form an image.

The image forming device according to a seventh aspect of the present invention is the device of the first aspect, wherein the position detection unit includes a marker arranged on an end of the transfer belt, and a position detection sensor that detects the marker.

The image forming device according to an eighth aspect of the present invention is the device of the seventh aspect, wherein the device further includes a rotation member that is arranged near the position in which the position detection sensor is arranged, and able to hit against to be in contact with the inner side of the transfer belt.

The image forming device according to a ninth aspect of the present invention is the device of the first aspect, wherein the second information relating to color concentration is a degree of reflection.

The image forming device according to a tenth aspect of the invention is the device of the ninth aspect, wherein the first information sensor is combined with the second information sensor.

The image forming device according to an eleventh aspect of the present invention is the device of the first aspect, wherein the surface of the transfer belt is formed by a material with rubber as the main component thereof.

A toner concentration adjustment method for an image forming device according to a twelfth aspect of the present invention has a position detection process, a first information detection process, a second information detection process, and an adjustment process. The position detection process detects a predetermined position of a transfer belt using the surface of the transfer belt. The first information detection process detects first information relating to the degree of reflection of the surface of the predetermined position on the transfer belt. The second information detection process detects second information relating to color concentration of pattern image that is formed to be read at the predetermined position. The adjustment process adjusts toner concentration at the time of forming an image based on the first and second information detected by the first information detection process and the second information detection process.

A program according to a thirteenth aspect of the present invention is a program that controls a computer to execute a position detection function that detects a predetermined position of a transfer belt by the surface of the transfer belt, a first information detection function that detects a first information relating to the degree of reflection of the surface of the predetermined position on the transfer belt, a second information detection function that detects a second information relating to color concentration of pattern image that is formed to be read at the predetermined position, and an adjustment function that adjusts toner concentration at the time of forming an image based on the first and second information detected by the execution of the first information detection function and the second information detection function.

A recording medium according to a fourteenth aspect of the present invention is a recording medium on which a program is recorded. This program controls a computer to execute a position detection function that detects a predetermined position of a transfer belt by the surface of the transfer belt, a first information detection function that detects a first information relating to the degree of reflection of the surface of the predetermined position of the transfer belt, a second information detection function that detects a second information relating to color concentration of pattern image that is formed to be read at the predetermined position, and an adjustment function for adjusting toner concentration at the time of forming an image based on the first and second information detected by the execution of the first information detection function and the second information detection function.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Below, a copying machine as an example of an image forming device in accordance with the present invention will be described.

First Embodiment

First, an overall configuration of the copying machine in accordance with a first embodiment will be described.

Figure 1:
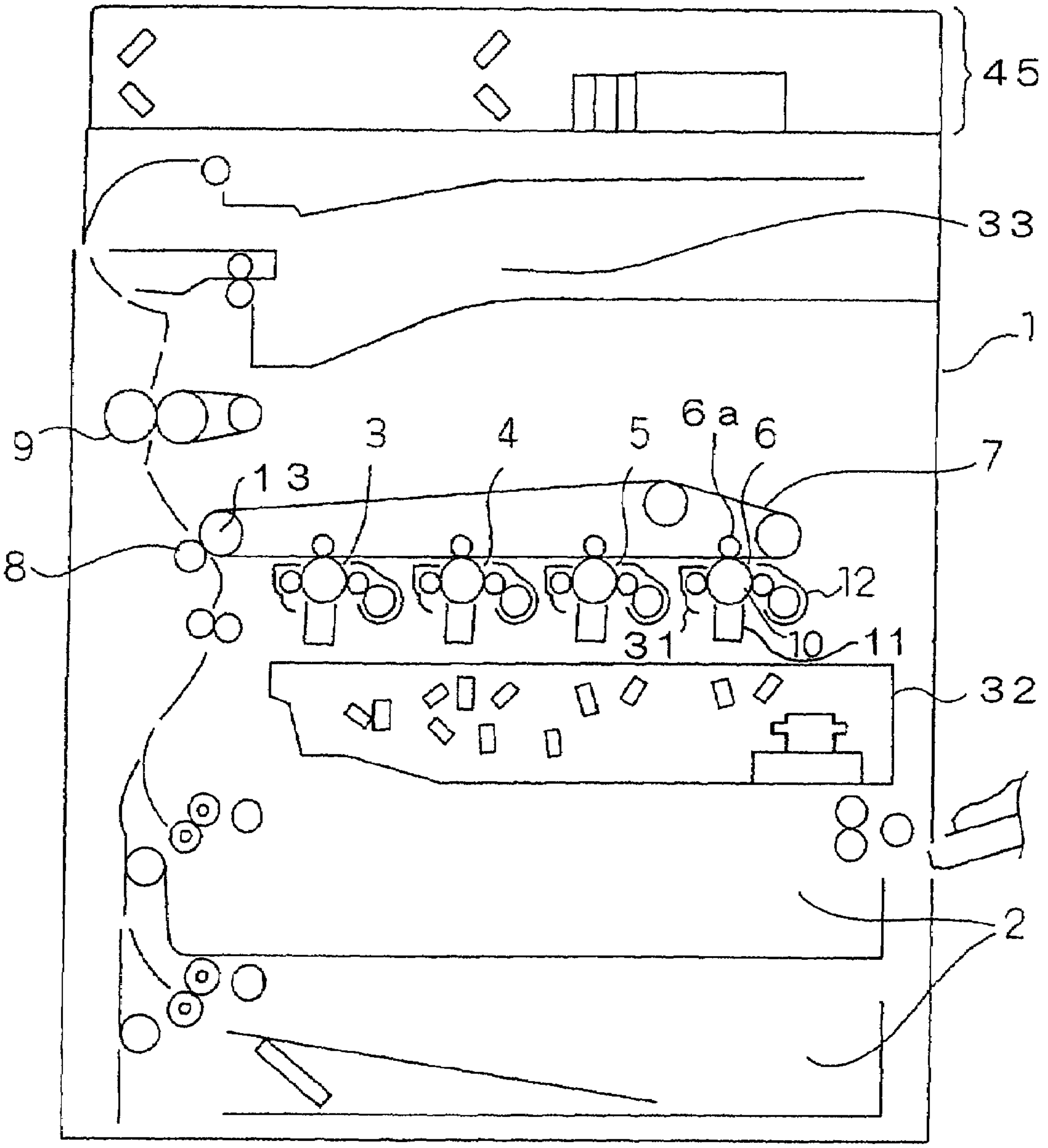
FIG. 1 is a front side cross-sectional view of a copying machine in accordance with a first preferred embodiment of the present invention.

FIG. 1 shows a front side cross-sectional view of the copying machine in accordance with a first preferred embodiment of the present invention. This copying machine has a main body 1, as well as two paper cassettes 2 that stores papers at the bottom of the main body 1. Furthermore, a document scanning unit 45 is arranged on top of the main body 1 of this copying machine. The document scanning unit 45 includes an exposure lamp, lens, mirror, and the like, and is able to scan images of documents.

This copying machine is a color copying machine in which tandem system is used. The copying machine has a black image forming unit 3, a yellow image forming unit 4, a cyan image forming unit 5, and a magenta image forming unit 6. An intermediate transfer belt 7 is arranged above these image forming units 3-6. The intermediate transfer belt 7 is provided to superimpose each of the images formed by the image forming units 3-6 before transferring the image onto a sheet of paper. In addition, the basic configuration of the four image forming units 3-6 is preferably the same. Here, only the magenta image forming unit 6 will be described as an example. The magenta image forming unit 6 has a photosensitive drum 10, an electrostatic charger 11, a developing unit 12, a first transfer roller 6*a*, a cleaning unit 31, and the like. A drum using an amorphous silicon photoreceptor is used as the photosensitive drum 10, for example.

Figure 2:
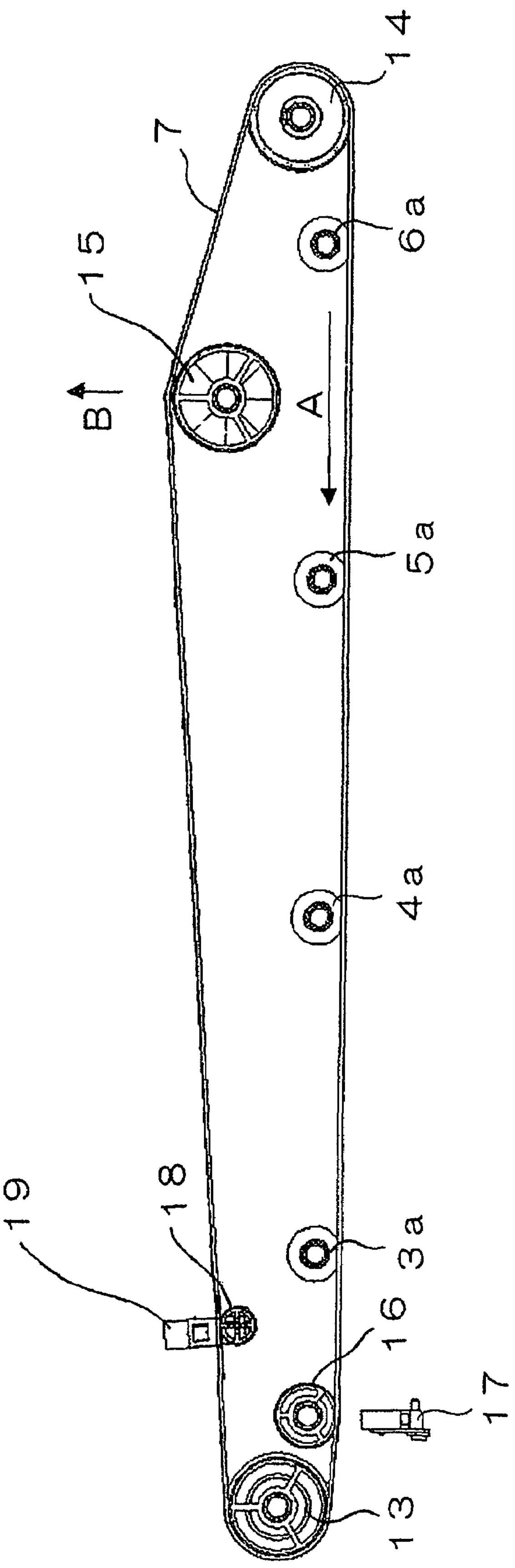
FIG. 2 is front side view showing the vicinity of an intermediate transfer belt of the copying machine in accordance with the first embodiment of the present invention.

Furthermore, referring to FIGS. 1 and 2, first transfer rollers 5*a*, 4*a*, and 3*a* are respectively included in each of the cyan image forming unit 5, yellow image forming unit 4, and black image forming unit 3 similar or identical to the magenta image forming unit 6. These first transfer rollers 3*a*, 4*a*, 5*a*, and 6*a* are arranged on the inner side of the intermediate transfer belt 7, and each sandwiching the intermediate transfer belt 7 and pressing against the photosensitive drums 10 thereof.

A laser scanning unit 32 (hereinafter referred to as LSU) is arranged below the four image forming units 3-6. The LSU 32 forms an electrostatic latent image by optical scanning the surface of each of the photosensitive drums of the four image forming units 3-6. In addition, the surface of each of the photosensitive drums is charged by a corresponding electrostatic charger.

A transfer roller 8 is arranged on one end of the intermediate transfer belt 7 (on the left end of FIG. 1). The transfer roller 8 transfers the toner image formed on the intermediate belt 7 onto a sheet of paper that is supplied from the paper cassette 2. Then, the transfer roller 8 presses against a driving roller 13 that is arranged on the inner side of the intermediate transfer belt 7, through the intermediate transfer belt 7. A fixing unit 9 is arranged above the transfer roller 8 to fix the toner image that is transferred onto the sheet of paper. Moreover, the sheet of paper with the toner image fixed thereon by the fixing unit 9 is discharged onto a discharge tray 33 that is arranged above the main body 1 and below the document scanning unit 45.

Next, the configuration of the intermediate transfer belt 7 and elements in the vicinity thereof will be described.

FIG. 2 shows a front side view of the intermediate transfer belt 7. The surface of the intermediate transfer belt 7 is formed of a material in which the main component thereof is rubber. As shown in FIG. 2, the intermediate transfer belt 7 rotates in the direction from the first transfer roller 6*a* to the first transfer roller 3*a* (refer to arrow A). The driving roller 13 is arranged on the inner side of the intermediate transfer belt 7, as it was described above to be on the left side of the first transfer roller 3*a* in FIG. 2. Furthermore, a driven roller 14 is arranged on the right side of the first transfer roller 6*a* in FIG. 2. A tension roller 15 is arranged above the first transfer rollers 5*a* and 6*a* between the driving roller 13 and the driven roller 14. The tension roller 15 is biased in the arrow B direction by a spring. Therefore, the tension of the intermediate belt 7 is maintained, since the expansion and contraction thereof due to temperature are absorbed by the tension roller 15.

A roller 16 is arranged in the inner side of the intermediate transfer belt 7 between the first transfer roller 3*a* and the driving roller 13. Further, a group of sensors 17 is arranged on the outer side of and below the intermediate transfer belt 7 that is opposite the position of the roller 16.

An optical sensor 19 is arranged near the driving roller 13, or more specifically, on the right side of the driving roller 13 and above upper portion of the intermediate transfer belt 7 that rotates. In addition, a roller 18 is arranged near the optical sensor 19, or more specifically, below the optical sensor 19 and on the inner side of the intermediate transfer belt 7.

Figure 3:
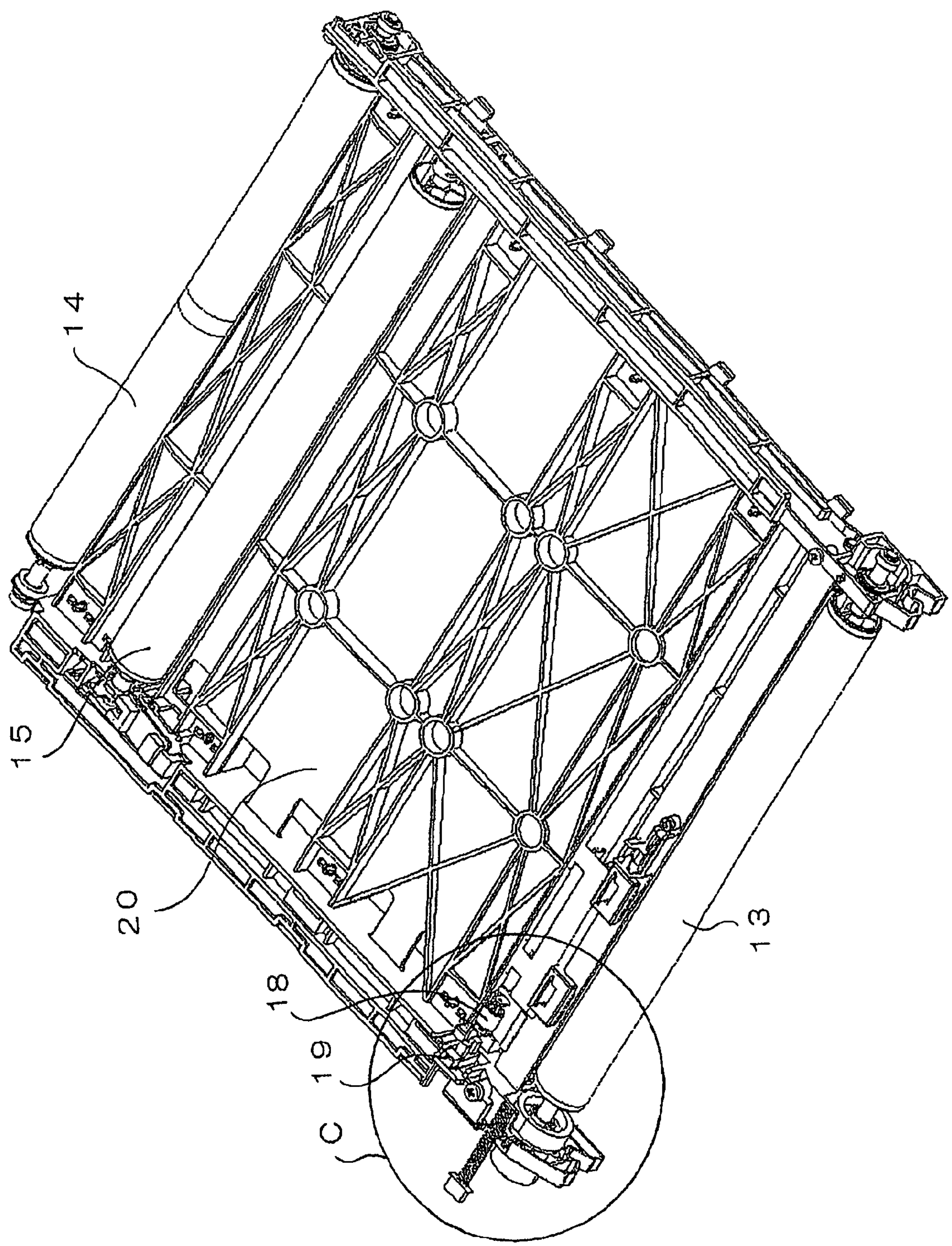
FIG. 3 is a perspective view of a chassis around which the intermediate transfer belt of the copying machine in accordance with the first embodiment of the present invention is wound.

FIG. 3 is a perspective viewed from above of the chassis 20 around which the intermediate transfer belt 7 is wound. As shown in FIG. 3, the driving roller 13, driven roller 14, and the tension roller 15 are rotatably mounted to the chassis 20. In addition, the above described optical sensor 19 and roller 18 are arranged in the vicinity of the end portion of the chassis 20.

Next, the optical sensor 19 and the roller 18 will be described.

Figure 4:
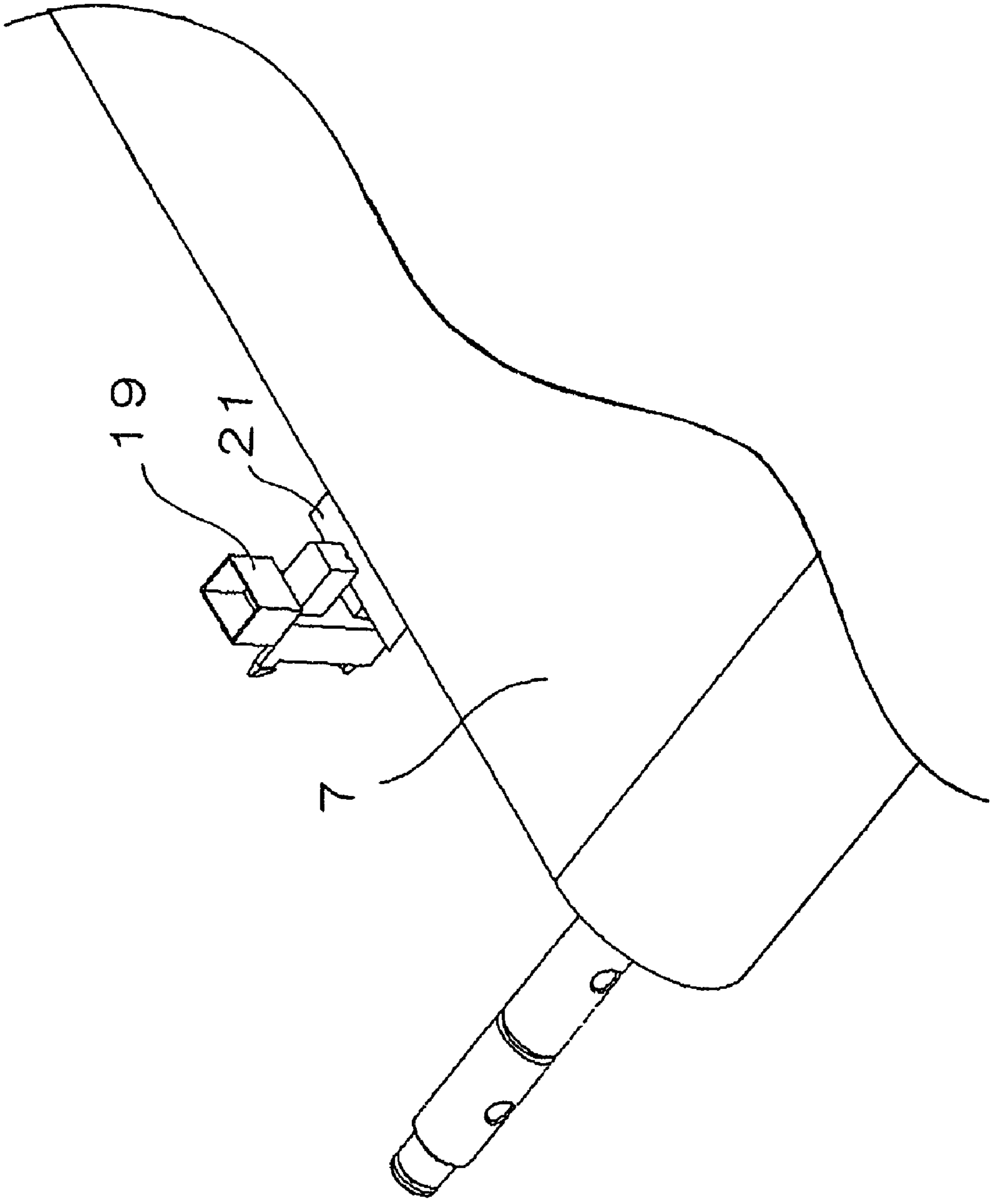
FIG. 4 is a perspective view of the vicinity of an optical sensor of the copying machine in accordance with the first embodiment of the present invention.

FIG. 4 shows the configuration of the enlarged relevant portion of the portion on which the optical sensor 19 is arranged. As shown in FIG. 4, a douser (marker) 21 is arranged on the end in the width direction (the direction that is perpendicular to the direction of rotation) of the intermediate transfer belt 7. The optical sensor 19 is a photo interrupter sensor (PI sensor) configured to detect the interruption of light via the douser 21. In this manner, the position of the intermediate transfer belt 7 is detected using the optical sensor 19 by detecting the douser 21 that is arranged on a predetermined position on the intermediate transfer belt 7.

Figure 5:
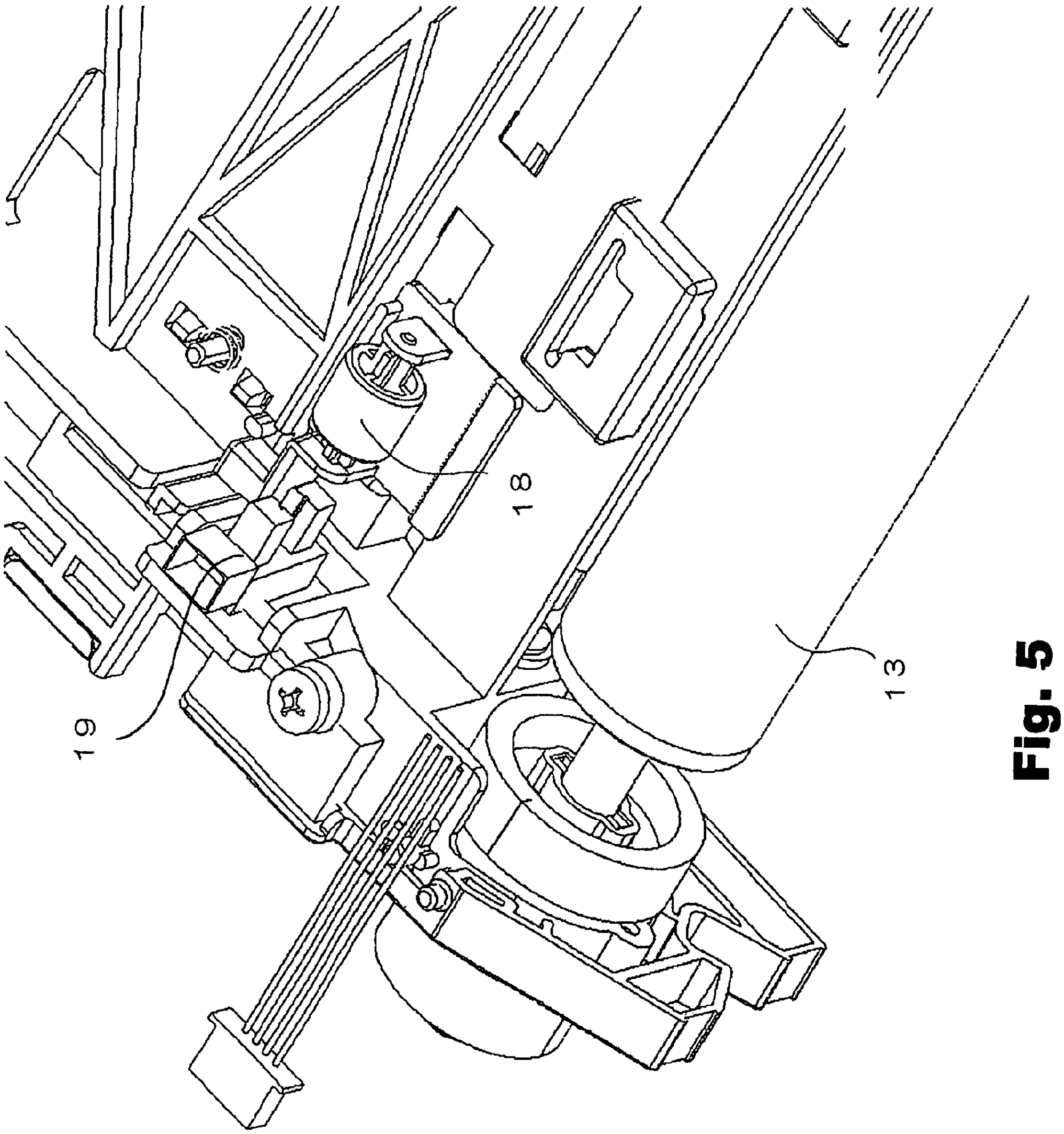
FIG. 5 is an enlarged view of portion C shown in FIG. 3.

FIG. 5 is an enlarged view of portion C in FIG. 3. As shown in FIG. 5, the roller 18 is arranged near the optical sensor 19, having a rotational axis with a direction that is substantially perpendicular with respect to the rotational direction of the intermediate transfer belt 7.

Next, the group of sensors 17 will be described.

Figure 6:
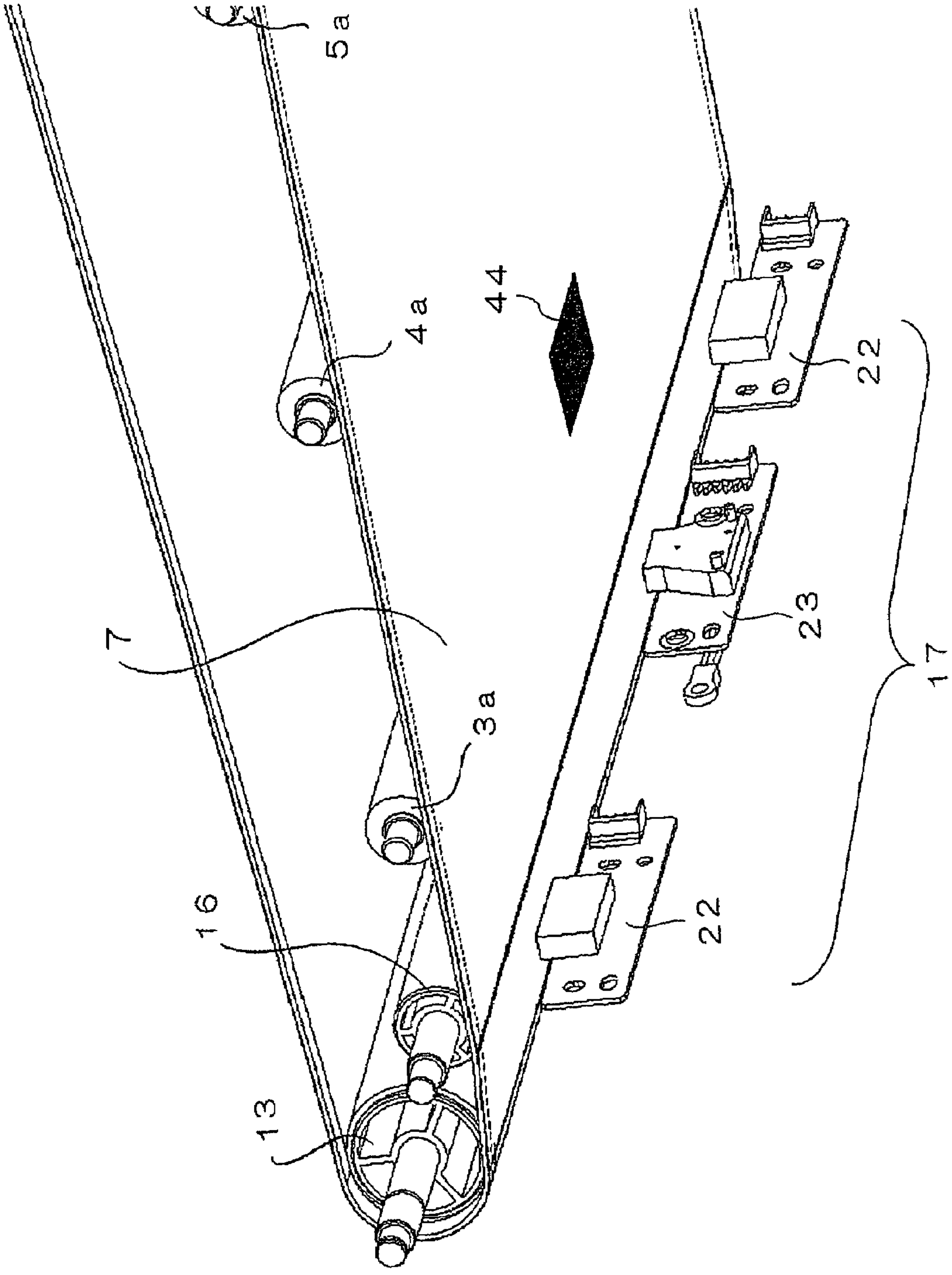
FIG. 6 is a perspective view of the vicinity of a group of sensors of the copying machine in accordance with the first embodiment of the present invention.

FIG. 6 is a perspective view looking from below the portion in which the group of sensors 17 is arranged. As shown in FIG. 6, the group of sensors 17 is preferably made of three sensors that are arranged to line up in the width direction of the intermediate transfer belt 7. The two sensors at the two ends are resist sensors 22 configured to detect whether an image on the intermediate transfer belt 7 is formed slanted with respect to the rotational direction. These sensors also collectively perform the correction of color deviance of the four colors. Meanwhile, the sensor arranged substantially in the center of the intermediate transfer belt 7 in the width direction is a concentration detection sensor 23 that detects the concentration of the color formed on the intermediate transfer belt 7.

The resist sensors 22 and the concentration detection sensor 23 are sensors that measure the degree of reflection of light on the surface of the intermediate transfer belt 7.

In addition, the two resist sensors 22 detect a linear image that is formed to be perpendicular with respect to the rotational direction of the intermediate transfer belt 7. Depending on the detection timing of the two resist sensors 22, the resist sensors 22 detect whether or not the image that is actually formed is formed perpendicular with respect to the rotational direction.

The concentration detection sensor 23 measures the degree of reflection, and detects the degree of reflection of the surface of the intermediate transfer belt 7 on which a pattern image is formed. The color concentration of the pattern image is calculated by converting the detected value of the degree of reflection of the surface of the intermediate transfer belt 7 into a color concentration according to a table that is stored in the memory. In addition, the concentration detection sensor 23 also detects the degree of reflection of the surface of the intermediate transfer belt 7 itself. Furthermore, the pattern image used to adjust the toner concentration is formed by the image forming unit of any of the image forming units 3, 4, 5, or 6.

Next, the configuration in which the toner concentration is adjusted using the optical sensor 19 described above, the concentration detection sensor 23, and the like, will be described.

Figure 7:
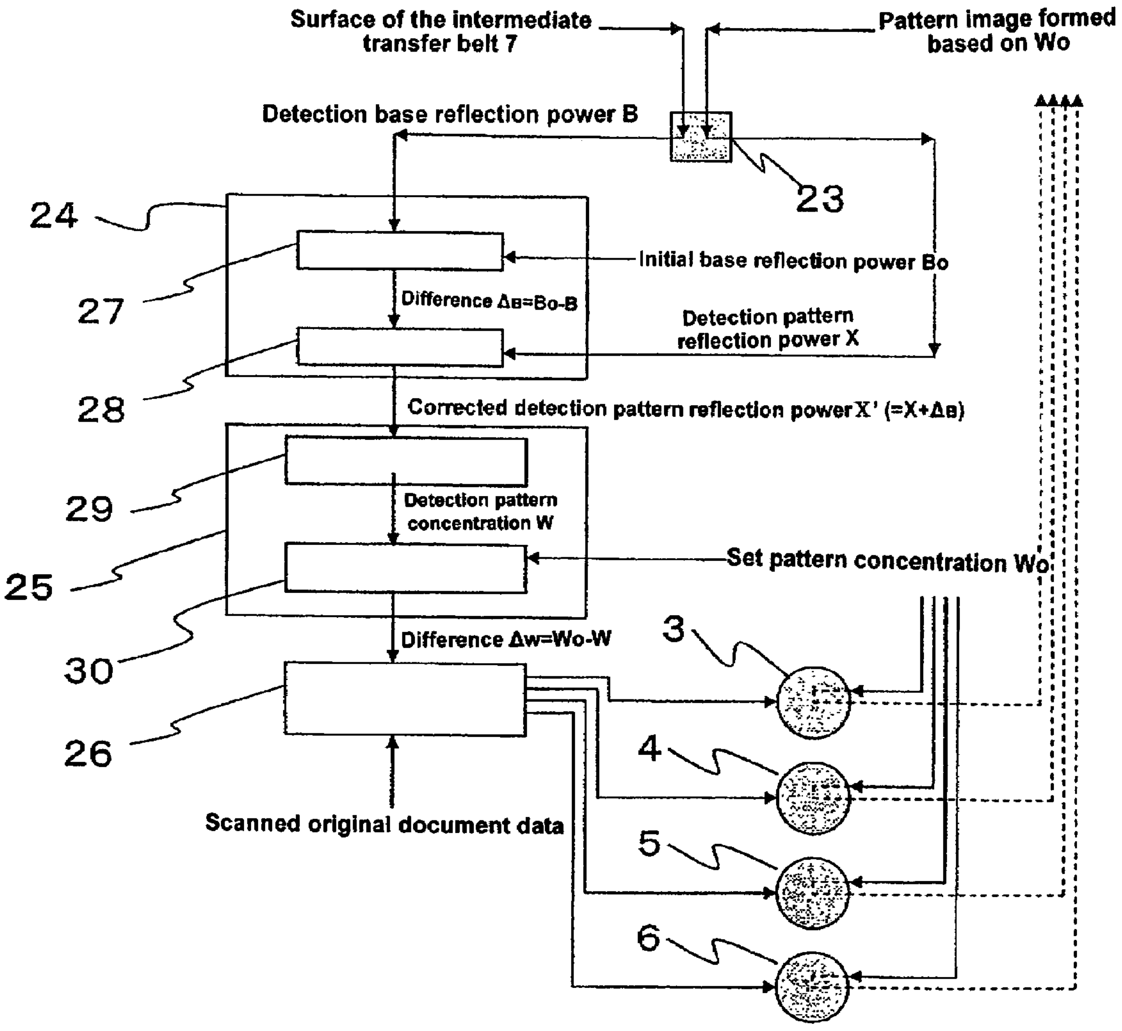
FIG. 7 is a diagrammatical view showing a configuration in which the toner concentration is adjusted in the copying machine in accordance with the first embodiment of the present invention.

FIG. 7 shows the configuration to adjust the toner concentration. As shown in FIG. 7, the copying machine in accordance with the present embodiment includes a reflection power detection correction unit 24, a comparison unit 25, and a control unit 26. The reflection power detection correction unit 24 uses the degree of reflection of the surface of the intermediate transfer belt 7 itself (hereinafter, referred to as detection base reflection power) that is detected by the concentration detection sensor 23 to correct the degree of reflection of the pattern image (hereinafter referred to as the detection pattern reflection power) that is detected. The comparison unit 25 calculates the color concentration of the pattern image from the detection pattern reflection power that is corrected, and compares the requested color concentration (hereinafter referred to as the detection pattern concentration) with the color concentration set in order to form the pattern image (hereinafter referred to as the set pattern concentration). The control unit 26 controls the toner concentration at the time when images are being formed at the image forming units 3, 4, 5, and 6, based on the result from the comparison unit 25.

The reflection power detection correction unit 24 includes a reflection power difference calculation unit 27 and a detection pattern reflection power calculation unit 28. The reflection power difference calculation unit 27 calculates the difference between the degree of reflection of the surface of the intermediate transfer belt 7 itself when in an unused state (hereinafter referred to as initial base reflection power), and the detection base reflection power. The detection pattern reflection power calculation unit 28 reflects this difference in the detection pattern reflection power.

A detection pattern concentration calculation unit 29 and a pattern concentration difference calculation unit 30 are arranged in the comparison unit 25. The detection pattern concentration calculation unit 29 calculates the detection pattern concentration from the detection pattern reflection power that is corrected. The pattern concentration difference calculation unit 30 obtains the difference between the detection pattern concentration and the set pattern concentration.

In addition, the transfer belt in the present invention corresponds to the intermediate transfer belt 7 of the present embodiment. Furthermore, the first information in the present invention corresponds to the detection base reflection power of the present embodiment, and the second information of the present invention corresponds to the detection pattern reflection power of the present embodiment. The initial information of the present invention corresponds to the initial base reflection power of the present embodiment. Moreover, the detected information correction unit of the present invention corresponds to the reflection power detection correction unit 24 of the present embodiment. The second information correction unit of the present invention corresponds to the detection pattern reflection power calculation unit 28 of the present embodiment. Furthermore, the rotation member of the present invention corresponds to the roller 18 of the present embodiment. Moreover, the position detection unit of the present invention corresponds to the optical sensor 19 and the douser 21 of the present embodiment. In addition, the position detection sensor of the present invention corresponds to the optical sensor 19 of the present embodiment, and the marker of the present invention corresponds to the douser 21 of the present embodiment. Furthermore, the first and second information sensors of the present invention correspond to the concentration detection sensor 23 of the present embodiment. It should be apparent from this disclosure that the concentration detection sensor 23 is configured to function as the first and second information sensors. It should also be apparent from this disclosure that separate sensors can also be used without departing from the scope of this invention. Moreover, the adjustment unit of the present invention corresponds to the image forming units 3, 4, 5, 6, reflection power detection correction unit 24, comparison unit 25, and control unit 26 of the present embodiment.

Next, the method of adjusting toner concentration of the copying machine of the present embodiment will be described. At the same time, an example of the adjustment process of the present invention will also be described. In addition, FIG. 7 is mainly referred to in the following description.

First, the time in which douser 21 is detected by the optical sensor 19 (refer to FIG. 4) is used as the standard time. For example, the degree of reflection of the surface of the intermediate transfer belt 7 itself (the detection base reflection power) is detected by the concentration detection sensor 23 at a timing after a predetermined time has lapsed, and let B be the value of the detection base reflection power.

In this manner, by having the timing in which the douser 21 is detected as the standard, any arbitrary position on the intermediate transfer belt 7, as the predetermined position, can be detected (this corresponds to an example of the position detection process of the present invention). Then, on this predetermined position, the degree of reflection of the surface of the intermediate transfer belt 7 itself is detected by the concentration detection sensor 23 (this corresponds to an example of the first information detection process of the present invention).

Here, in the present embodiment, a material in which rubber is preferably the main component is used for the surface of the intermediate belt 7. Therefore, the surface may roughen up, as additives (for example, oxidized titanium, and the like), and the like contained in the toner may stick to the surface, and bleach the surface of the belt.

Compared to a state in which a belt has not been used, an example is described below of the case that the additives and the like attach to the surface and that the surface has roughed up.

The value of the initial base reflection power, which is the degree of reflection of the surface when in an unused state, is obtained using the concentration detection sensor 23 as the value B0.

When the attachment of the above additives and the like to the belt occurs the degree of reflection detected by the concentration detection sensor 23 will become lower because of the diffused reflection caused by the additives. Therefore, the value B of the detection base reflection power will become lower compared to B0 of the initial base reflection power.

Next, based on the value W0 of the set pattern concentration, a pattern image is formed on the intermediate transfer belt 7 by one of any of the four image forming units 3-6. Thus, any one of the four image forming units 3-6 is also configured to be a pattern image forming unit. In the present embodiment, the magenta image forming unit 6 will be described as an example. Here, using the detection timing of the douser 21 as the standard, the magenta image forming unit 6 forms the image at the timing that the pattern image was formed to be read at a predetermined position in which the detection base reflection power B was detected. An example of the pattern image is shown in FIG. 6 as pattern image 44. In addition, an example of the pattern information of the present invention corresponds to the set pattern concentration W0 of the present embodiment.

Then, the degree of reflection of the pattern image 44 (detection pattern reflection power) on the intermediate transfer belt 7 is detected by the concentration detection sensor 23. The value of this detection pattern reflection power will be referred to as X (corresponding to an example of the second concentration detection process of the present invention). Furthermore, the detection timing of the concentration detection sensor 23 can be after a predetermined time after the input of the signal to form the pattern image, or can be the detection timing of the douser 21, as long as the degree of reflection of the pattern image is detected by the concentration detection sensor 23.

Next, the reflection power difference calculation unit 27 calculates the difference ΔB (=B0−B) by subtracting the detection base reflection power B from the initial base reflection power B0.

Then, the detection pattern reflection power calculation unit 28 reflects the value of the difference ΔB in the detection pattern reflection power X. More specifically, the detection pattern concentration (detection pattern reflection power X) is detected to be a value lower than the concentration that is actually formed because of the diffused reflection due to the existence of attachments on the surface of the belt compared to an unused state. Therefore, the detection pattern reflection power calculation unit 28 outputs a corrected detection pattern reflection power X' (=X+ΔB) to the comparison unit 25 by adding ΔB to the detection pattern reflection power X.

Next, the detection pattern concentration calculation unit 29 calculates the color concentration of the pattern image (detection pattern concentration) from the corrected detection pattern reflection power X'. The calculated value of the detection pattern concentration will be referred to as W. Furthermore, when the toner concentration is high, a smaller degree of reflection will be detected because light will be largely shielded by the amount of attachment of toner on the intermediate transfer belt 7. In addition, when the toner concentration is low, a larger degree of refection will be detected because the amount of toner attached is small.

Next, the pattern concentration difference calculation unit 30 compares the set pattern concentration W0 that is used at the time of forming the pattern image, with the detection pattern concentration W, and output the comparison result to the control unit 26.

Here, when the concentration of the pattern image that is actually formed becomes lower than that of the set concentration value due to the degradation of toner, the comparison unit 25 outputs the calculated difference ΔW (=W0−W) to the control unit 26.

The control unit 26 increases the toner concentration of the data of the original document data scanned by the document scanning unit 45 by an amount of ΔW at the time of forming the image under a normal operation, and controls the magenta image forming unit 6 to form the image. Furthermore, the toner concentration can be increased by increasing the bias voltage applied to the first transfer roller 6*a* of the magenta image forming unit 6, and adjusting the voltage applied to the electrostatic charger 11.

In addition, when ΔW is within an allowable range, the control unit 26 does not adjust the toner concentration. In addition, when the concentration of the pattern image becomes higher, according to the comparison result of the comparison unit 25, the control unit 26 decreases the toner concentration by the amount ΔW and controls the magenta image forming unit 6 to form the image.

In this manner, in the present embodiment, since the change over time of the degree of reflection of the surface of the intermediate belt 7 is reflected in the detection result of the pattern image, toner concentration can be adjusted more accurately compared to a conventional way.

In addition, since the change over time of the degree of reflection of the surface of the intermediate transfer belt 7 can be taken into consideration, toner concentration can be adjusted even in a case in which attachments exist on the surface due to a solvent that contains toner, and a rubber material can be used on the surface of the intermediate transfer belt 7. In this way, since a rubber material can be used, a wide nip area can be ensured when transferring, and increases the transfer efficiency.

Furthermore, in the present embodiment, since the roller 18 is arranged to be in a direction that is perpendicular with respect to the rotation direction of the intermediate transfer belt 7, the sagging of the intermediate transfer belt 7 can be prevented at the position in which the detection of the douser 21 is performed, and the detection of the douser 21 can be performed more accurately by the optical sensor 19.

In addition, the optical sensor 19 can be arranged in a position different from the position specified in the present embodiment. However, when arranging the optical sensor 19 to be near the tension roller 15, it is difficult to arrange the optical sensor 19 because the position of the tension roller 15 changes due to the change in the length of the inner circumference of the intermediate transfer belt 7. Meanwhile, when arranging the optical sensor 19 to be near the first transfer rollers 3*a*, 4*a*, 5*a*, and 6*a*, there is a possibility that the optical sensor 19 may be damaged by the applied voltage. Therefore, it is preferable that the optical sensor 19, which is at a position that is relatively easily sagged, is arranged above the belt near the downstream side of the driving roller 13.

Furthermore, in the present embodiment, the douser 21 is arranged at the end portion in the width direction of the intermediate transfer belt 7. However, a configuration of forming a through-hole or a cutout or the like on the end in the width direction of the intermediate transfer belt 7 as an example of a marker without the douser 21 in the present invention, and detecting the through-hole or the cutout or the like is also acceptable.

In addition, the concentration detection sensor 23 of the present embodiment corresponds to an example of the first information sensor that is combined with the second information sensor of the present invention. However; the concentration detection sensor 23 can also be arranged separately from the sensor that detects the degree of reflection of the surface of the intermediate transfer belt 7 itself and the sensor that detects the degree of reflection of the pattern image.

Furthermore, in the comparison unit 25 of the present embodiment, the corrected detection pattern reflection power X' is converted into color concentration (detection pattern concentration W) and compared with the set pattern concentration W0. However, the image forming units 3-6 can be controlled in a way that the corrected detection pattern reflection power X' is compared against an expected degree of reflection X0 to be detected which the set pattern concentration W0 can be obtained without calculating the detection pattern concentration W.

Here, the expected degree of reflection X0 to be detected at which the set pattern concentration W0 can be obtained is the degree of reflection that is obtained at the time the pattern image formed with the set pattern concentration W0 is detected by the concentration detection sensor 23 in the initial state that the intermediate transfer belt has not been used and toner is not degraded.

Second Embodiment

A second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Below, a copying machine in accordance with a second preferred embodiment of the present invention will be described. In addition, the copying machine of the second embodiment has the same basic configuration as that of the first embodiment. However, the configuration of using the optical sensor 19, the concentration detection sensor 23, and the like to adjust the toner concentration is different from that of the first embodiment. Therefore, mainly this difference will be described. Furthermore, elements with the same configuration as those of the first embodiment will be given the same numerals.

Figure 8:
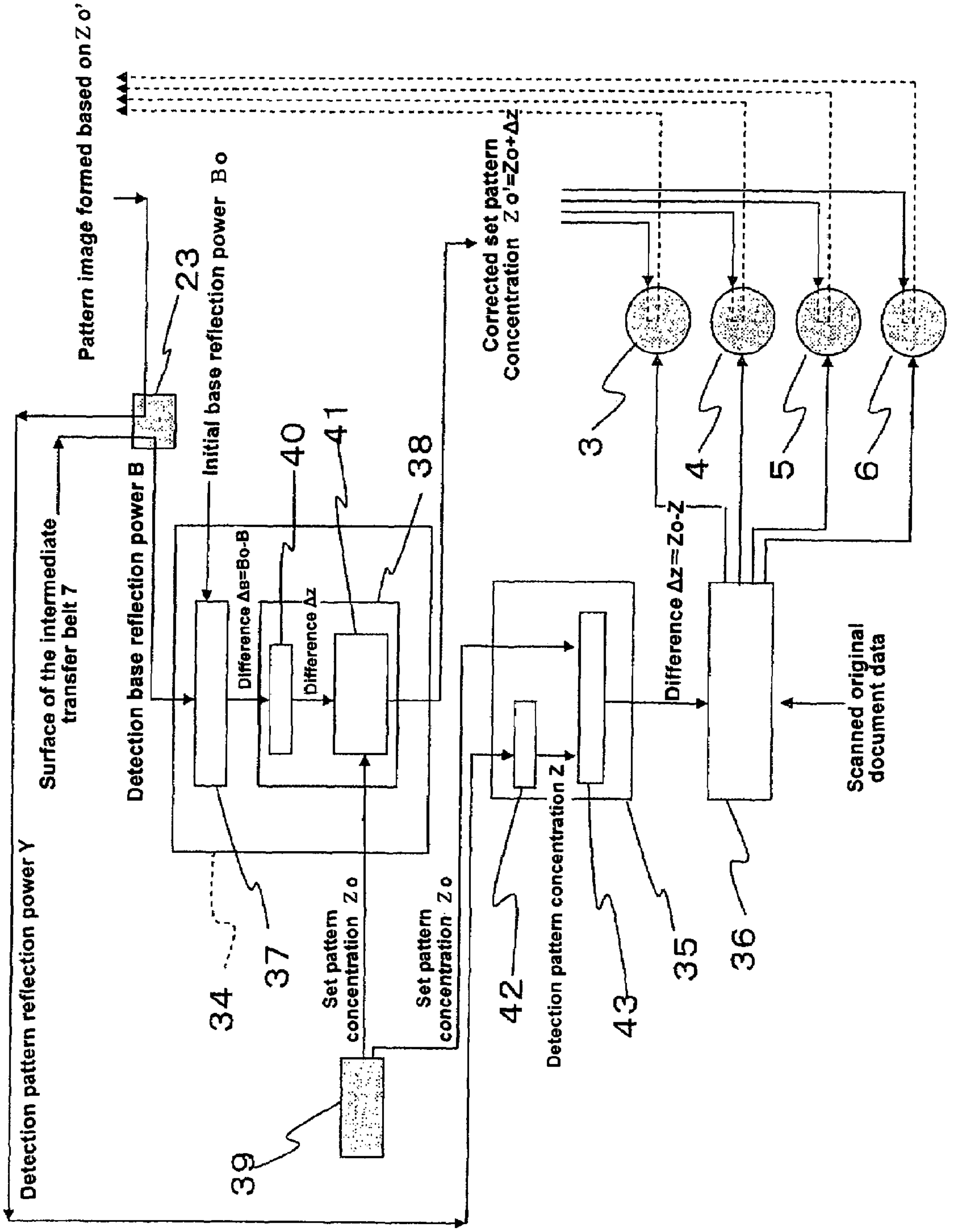
FIG. 8 is a diagrammatical view showing a configuration in which the toner concentration is adjusted in the copying machine in accordance with a second preferred embodiment of the present invention.

FIG. 8 shows the configuration of the adjustment of the toner concentration. As shown in FIG. 8, the copying machine of the second embodiment has a pattern information storage unit 39 and a set pattern concentration correction unit 34. The pattern information storage unit 39 stores pattern information related to color concentration to form pattern images. The set pattern concentration correction unit 34 corrects the color concentration of pattern information (hereinafter referred to as set pattern concentration), using the degree of reflection of the surface of the intermediate transfer belt 7 itself (hereinafter referred to as detection base reflection power) that is detected by the concentration detection sensor 23.

In addition, a comparison unit 35 is provided, which calculates the color concentration of pattern image (detection pattern concentration) from the degree of reflection of the pattern image (hereinafter referred to as detection pattern reflection power) that is formed based on the corrected set pattern concentration that is detected by the concentration detection sensor 23, and compares it with the set pattern concentration that has not been corrected. Furthermore, a control unit 36 is provided, which controls the toner concentration at the time of the image formation of the image forming units 3-6, based on the result of the comparison unit 35.

The set pattern concentration correction unit 34 includes a reflection power difference calculation unit 37, and a set pattern concentration calculation unit 38. The reflection power difference calculation unit 37 calculates the difference between the degree of reflection of the surface of the intermediate transfer belt 7 itself in an unused state (hereinafter referred to as the initial base reflection power) with the detected base reflection power. The set pattern concentration calculation unit 38 reflects this difference in the set pattern concentration.

The set pattern concentration calculation unit 38 includes a color concentration difference calculation unit 40 that calculates the difference of the color concentration from the difference of the degree of reflection, and a color concentration difference reflection unit 41 that reflects the difference of the color concentration in the set pattern concentration.

The comparison unit 35 includes a detection pattern concentration calculation unit 42 that calculates the detection pattern concentration from the detection pattern reflection power, and a pattern concentration difference calculation unit 43 that obtains the difference between the detection pattern concentration and the set pattern concentration that has not been corrected.

In addition, the pattern information correction unit of the present invention corresponds to the set pattern concentration correction unit 34 of the present embodiment. The pattern information calculation unit of the present invention corresponds to the set pattern concentration calculation unit 38 of the present embodiment. Furthermore, the adjustment unit of the present invention corresponds to the pattern information storage unit 39, the set pattern concentration correction unit 34, the image forming units 3-6, the comparison unit 35, and the control unit 36 of the present embodiment.

Next, a toner concentration adjustment method of the copying machine of the present embodiment will be described, and at the same time, an example of the adjustment process of the present invention will be described. In addition, FIG. 8 will be mainly referred to in the following description. Furthermore, in the present embodiment, same as the first embodiment, a case in which the toner concentration of the magenta color is adjusted will be described.

First, the degree of reflection of the surface of the intermediate transfer belt 7 itself (detection base reflection power) is detected by the concentration detection sensor 23 at the timing after a predetermined time has elapsed, for example, using the timing in which the douser 21 is detected by the optical sensor 19 (refer to FIG. 4) as the standard. The value of the detection base reflection power will be referred to as B.

In this manner, any arbitrary position on the surface of the intermediate transfer belt 7 set as the predetermined position can be detected (corresponding to an example of the position detection process of the present invention), by having the timing in which the douser 21 is detected as the standard. Then, the degree of reflection of the surface of the intermediate transfer belt 7 itself on this predetermined position is detected by the concentration detection sensor 23 (corresponding to an example of the first information detection process of the present invention).

Here, in the present embodiment, since rubber is the main component of the material used for the surface of the intermediate transfer belt 7, with additives (for example, oxidized titanium and the like) contained in the toner and the like attaching to the surface, the surface of the belt may be breached and roughened.

An example of the case in which additives and the like attach to the surface and the surface of the belt is roughed compared to an unused state will be described below.

The value of the initial base reflection power, which is the degree of reflection of the surface in an unused state, obtained by the concentration detection sensor 23 will be referred to as B0.

In the case that the above additives and the like attach to the surface, the degree of reflection detected by the concentration detection sensor 23 decreases because of the diffused reflection due to the attachments. Therefore, the value of the detection base reflection power B decreases compared to the initial base reflection power B0.

Next, the difference ΔB (=B0−B) is calculated by subtracting the detection base concentration B from the initial base concentration B0 by the reflection power difference calculation unit 37.

Next, the difference ΔB is converted into the difference of the color concentration ΔZ by the color concentration difference calculation unit 40.

Next, the value of the difference ΔZ is reflected in the set pattern concentration Z0 that is determined in advance to form the pattern image by the color concentration difference reflection unit 41. More specifically, the degree of reflection will be detected to be lower compared to the unused state because of the diffused reflection due to the existence of the attachments on the surface of the intermediate transfer belt 7. Here, in the case that toner concentration is high, the degree of reflection is detected to be lower. In the case that the toner concentration is low, the degree of reflection is detected to be higher. In this manner, if the degree of reflection is detected to be lower, the concentration will be determined to be higher. Thus, it is necessary to lower the set pattern concentration Z0. Therefore, a corrected set pattern concentration Z0' (=Z0−ΔZ) is outputted by subtracting the difference ΔZ from the set pattern concentration Z0.

Next, based on the corrected set pattern concentration Z0', a pattern image is formed on the intermediate transfer belt 7 by the magenta image forming unit 6. Here, using the timing when the douser 21 is detected as the standard, the image is formed at the timing that the pattern image is formed on the predetermined position that the above described color concentration is detected.

Then, the degree of reflection of the pattern image (detected pattern reflection power) is detected by the concentration detection sensor 23. The value of the detection pattern reflection power is referred to as Y (corresponding to an example of the second information detection process of the present invention). Furthermore, the detection timing of the concentration detection sensor 23 can be after the predetermined time from the output of the signal to form the pattern image, or can be the detection timing of the douser 21, as long as the degree of reflection of the pattern image is detected by the concentration detection sensor 23.

Next, in the pattern concentration calculation unit 42, the color concentration of the pattern image (detection pattern concentration) from the detection pattern reflection power Y is calculated. The value of the calculated detection pattern concentration will be referred to as Z.

Next, in the pattern concentration difference calculation unit 43, the set pattern concentration Z0, which is determined in advance to form the pattern image, and the detection pattern concentration Z are compared, and the comparison result is outputted to the control unit 36.

Here, in the case that the concentration of the pattern image that is actually formed is lower than the set concentration value because of the degradation of toner, a calculated difference ΔZ (=Z0−Z) by the comparison unit 35 will be outputted to the control unit 36.

The control unit 36 controls the forming of the image of the original document data scanned by the document scanning unit 45 by having the toner concentration of the magenta image forming unit increase an amount of ΔZ, when forming an image under a normal operation. In addition, the toner concentration can be increased by increasing the bias voltage applied to the first transfer roller 6*a* of the magenta image forming unit 6, or adjusting voltage applied to the electrostatic charger 11.

In addition, in the case that ΔZ is within an accepted range, the control unit 36 will not adjust the toner concentration. Furthermore, in the case that the concentration of the pattern image increases, according to the comparison result from the comparison unit 35, the control unit 36 will control the forming of the image in the magenta image forming unit 6 by decreasing the toner concentration by the amount of ΔZ.

In this manner, in the second embodiment, different from the first embodiment, the change over time of the surface of the intermediate transfer belt 7 is reflected in the concentration of the pattern image, and not the detection result of the pattern image. Therefore, same as the first embodiment, in the copying machine of the second embodiment, it is possible to adjust the toner concentration more accurately compared to a conventional way.

In addition, in the comparison unit 35 of the present embodiment, the detection pattern reflection power Y is converted into the color concentration (detection pattern concentration Z) and then compared with the set pattern concentration Z0. However, the image forming units 3-6 can be controlled by comparing the expected reflection power Y0 that is detected with the set pattern concentration Z0, and the detection pattern reflection power Y, without calculating the detection pattern concentration Z.

Here, the expected reflection power Y0 that is detected with the set pattern concentration Z0 is the degree of reflection obtained at the time the concentration detection sensor 23 detected the formed pattern image with the set pattern concentration Z0, when the intermediate transfer belt is in an initial state in which the belt is unused, and in a state that toner is not degraded.

In addition, in the above described two embodiments, the magenta image forming unit 6 is used as an example for describing the method of adjusting the toner concentration. However, the cyan image forming unit 5, yellow image forming unit 4, and the black image forming unit 3 can be used in the same manner to adjust the toner concentration.

Furthermore, in the two embodiments, a copying machine of tandem system having four image forming units 3-6 is described as an example. However, the present invention can also be applied to a color copying machine of the 1-drum method having an intermediate transfer belt.

In addition, in the two embodiments, the material used for the surface of the intermediate transfer belt 7 has rubber as the main component thereof. However, a belt made of plastic can be used. Furthermore, in the two embodiments, only a case that the surface of the belt turned white is described. However, a case that the value of B is greater than B0 due to stain on the surface of the belt can also be used.

Furthermore, the program of the present invention is a program that operates in cooperation with a computer, and used to execute, via the computer, operations of the above described adjustment process of the toner concentration adjustment method of the image forming device of the present invention.

In addition, the recording media of the present invention records the program used to execute, via the computer, all or a part of operations of the above described adjustment process of the toner concentration adjustment method of the image forming device of the present invention. The program is readable by the computer, and the read program executes the operation in cooperation with the computer.

Furthermore, the "process operations" of the present invention means all or a part of the operations of the above described steps.

In addition, one form of application of the program of the present invention can be a form in which the computer readable program is recorded in a recording media such as ROM and the like and operates in cooperation with the computer.

In addition, one form of application of the program of the present invention can be a form in which the program is transmitted within transmission medium such as internet, light, radio waves, sound waves, and the like, and read by a computer, and operates in cooperation with the computer.

Furthermore, the above described computer of the present invention is not limited to simply hardware such as CPU and the like, and can be firmware, OS, and the like, and can further include peripheral devices.

In addition, as described above, the configuration of the present invention can be implemented using software or hardware.

INDUSTRIAL APPLICABILITY

The image forming device of the present invention and the toner concentration adjustment method for the image forming device have the effect of adjusting toner concentration more accurately compared to a conventional device and method, and are useful to image forming devices such as copying machines, printers, facsimile machines, and the like.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of an image forming device equipped with the present invention. Accordingly, these terms, as utilized to describe the present invention should be interpreted relative to an image forming device equipped with the present invention as used in the normal riding position. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image forming device comprising:

an image forming unit having a surface being configured to have a toner image formed thereon;

a transfer belt being configured to have the toner image formed in the image forming unit transferred thereon;

a position detection unit being configured to detect a predetermined position of the transfer belt;

a first information sensor being configured to detect first information relating to a degree of reflection of the surface of the transfer belt at the predetermined position;

a second information sensor being configured to detect second information relating to color concentration of a pattern image being formed to be read at the predetermined position; and an adjustment unit being configured to adjust toner concentration at the time of forming the image based on the first information and second information detected by the first information sensor and the second information sensor, the adjustment unit includes a detected information correction unit configured to correct the second information detected by the second information sensor using the first information detected by the first information sensor.

2. The image forming device according to claim 1, wherein the adjustment unit includes a pattern image forming unit configured to form the pattern image on the predetermined position on the transfer belt based on pattern information relating to color concentration to form the pattern image, a comparison unit configured to compare the second information that is corrected by the detected information correction unit with the pattern information, and a control unit configured to control the toner concentration based on the result of the comparison unit.

3. The image forming device according to claim 2, wherein the detected information correction unit includes a difference calculation unit configured to obtain the difference between the first information and an initial information relating to the degree of reflection of the surface of the transfer belt in an initial state, and a second information correction unit configured to reflect the difference in the second information.

4. The image forming device according to claim 1, wherein the adjustment unit includes a pattern information storage unit configured to store pattern information relating to color concentration to form the pattern image;

a pattern information correction unit configured to correct the pattern information that is stored in the pattern information storage unit using the first information that is detected by the first information sensor, a pattern image forming unit configured to form the pattern image on the predetermined position on the transfer belt based on the pattern information that is corrected by the pattern information correction unit, a comparison unit configured to compare the second information that is detected by the second information sensor with the pattern information that has not been corrected, and a control unit configured to control the toner concentration based on the result of the comparison unit.

5. The image forming device according to claim 4, wherein the pattern information correction unit includes a difference calculation unit configured to obtain the difference between the first information and an initial information relating to the degree of reflection of the surface of the transfer belt in an initial state, and a pattern information calculation unit configured to reflect the difference in the pattern information.

6. The image forming device according to claim 1, wherein the control unit adjusts concentration information in image information to form the image.

7. The image forming device according to claim 1, wherein the position detection unit includes a marker arranged on an end of the transfer belt, and a position detection sensor to detect the marker.

8. The image forming device according to claim 7, further comprising a rotation member arranged near the position in which the position detection sensor is arranged, and configured to contact the inner side of the transfer belt.

9. The image forming device according to claim 1, wherein the second information relating to the color concentration is a degree of reflection.

10. The image forming device according to claim 9, wherein the first information sensor is combined with the second information sensor.

11. The image forming device according to claim 1, wherein the surface of the transfer belt is formed by a material with rubber as the main component thereof.

12. A toner concentration adjustment method for an image forming device, comprising:

a position detection process to detect a predetermined position on a surface of a transfer belt;

a first information detection process to detect first information relating to the degree of reflection of the surface of the predetermined position on the transfer belt;

a second information detection process to detect second information relating to color concentration of a pattern image that is formed on the predetermined position; and an adjustment process to adjust toner concentration at the time of forming an image based on the first and second information detected by the first information detection process and the second information detection process, the adjustment process includes a detected information correction process to correct the second information detected by the second information detection process using the first information detected by the first information detection process.

13. A recording media on which a program for controlling a computer is recorded, the program comprising:

a position detection function to detect a predetermined position on the surface of a transfer belt;

a first information detection function to detect first information relating to the degree of reflection of the surface of the predetermined position of the transfer belt;

a second information detection function to detect second information relating to color concentration of pattern image that is formed on the predetermined position; and an adjustment function to adjust toner concentration at the time of forming an image based on the first and second information detected by the execution of the first information detection function and the second information detection function, the adjustment function includes a detected information correction function to correct the second information detected by the second information detection function using the first information detected by the first information detection function.

* * * * *